Figure 1:
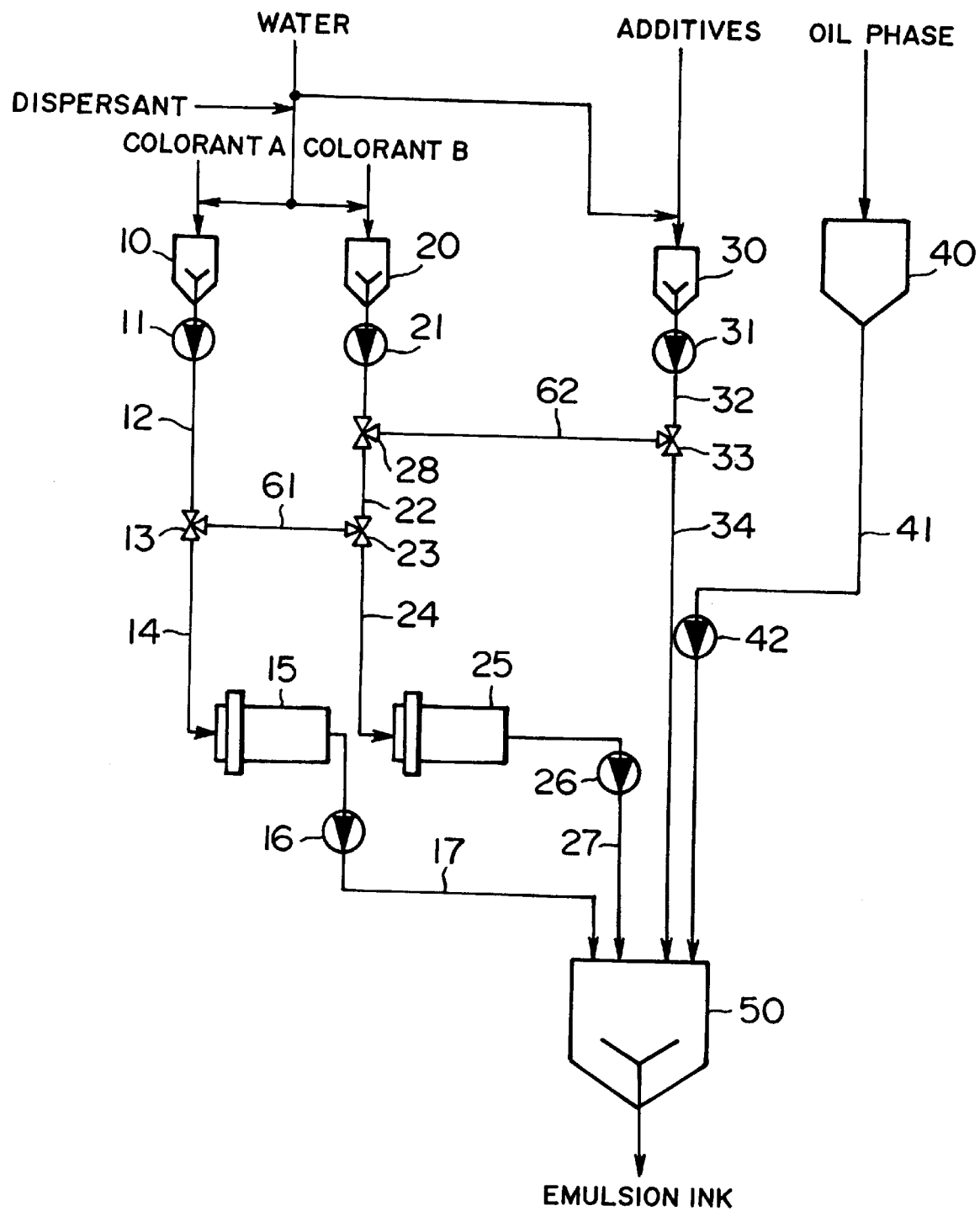

United States Patent

Okuda et al.

[11] Patent Number: 5,904,759
[45] Date of Patent: May 18, 1999

[54] PROCESS AND APPARATUS FOR PREPARING EMULSION INK FOR STENCIL PRINTING

[75] Inventors: Sadanao Okuda; Masato Ishikawa; Takashi Suzuki; Yoshihiro Hayashi, all of Inashiki-gun, Japan

[73] Assignee: Riso Kagaku Corporation, Tokyo, Japan

[21] Appl. No.: 08/987,780

[22] Filed: Dec. 9, 1997

[30] Foreign Application Priority Data

Dec. 10, 1996 [JP] Japan .................................. 8-351881

[51] Int. Cl.⁶ .................................................. C09D 11/02
[52] U.S. Cl. ........................................ 106/31.26; 106/31.6
[58] Field of Search ................................ 106/31.26, 31.6

[56] References Cited

U.S. PATENT DOCUMENTS

| | | | |
|---|---|---|---|
| 3,421,910 | 1/1969 | Gilson et al. | 106/31.26 |
| 5,395,534 | 3/1995 | Mizobuchi | 106/31.26 |
| 5,575,839 | 11/1996 | Okuda | 106/31.26 |
| 5,609,670 | 3/1997 | Okuda | 106/31.26 |
| 5,637,137 | 6/1997 | Okuda et al. | 106/31.26 |
| 5,759,245 | 6/1998 | Okuda et al. | 106/31.26 |
| 5,776,232 | 7/1998 | Okuda et al. | 106/31.26 |

FOREIGN PATENT DOCUMENTS

| | | |
|---|---|---|
| 0661356A1 | 7/1995 | European Pat. Off. . |
| 61-255967 | 11/1986 | Japan . |
| 64-14284 | 1/1989 | Japan . |
| 8-218025 | 8/1990 | Japan . |
| 4-132777 | 5/1992 | Japan . |
| 5-117565 | 5/1993 | Japan . |
| 7-188598 | 7/1995 | Japan . |
| 8-34944 | 8/1996 | Japan . |

OTHER PUBLICATIONS

Fujita Hiroshi, "Binder Comprising Modified Chlorinated Polyolefin", Patent Abstracts of Japan, JP 04372641, vol. 017, No. 247, Dec. 25, 1992.

Primary Examiner—Helene Klemanski
Attorney, Agent, or Firm—Pillsbury Madison & Sutro LLP

[57] ABSTRACT

A process for preparing a stencil printing emulsion ink which is a water-in-oil (W/O) emulsion having an oil phase and a water phase and containing a water-insoluble colorant in the water phase, is provided. The process comprises the steps of preparing an aqueous dispersion of said water-insoluble colorant separately from water or an aqueous solution of the remaining water phase components, and adding said aqueous dispersion and water or said aqueous solution separately to said oil phase for emulsification. The process is suitable to produce emulsion inks of various colors, particularly of mixed colors containing two or more colorants in the water phase with a fixed formulation of the oil phase.

10 Claims, 2 Drawing Sheets

PROCESS AND APPARATUS FOR PREPARING EMULSION INK FOR STENCIL PRINTING

The present invention relates to a process and an apparatus for preparing a stencil printing emulsion ink which has an oil phase and a water phase and contains a water-insoluble colorant in the water phase, and more specifically relates to a process and an apparatus in which the emulsion ink is readily prepared and which can be applied to preparation of various emulsion inks of mixed colors containing two or more kinds of water-insoluble colorants in the water phase.

Stencil printing is achieved by perforating a stencil sheet to make a master, and passing inks through the perforated portions of the master to an article to be printed such as printing paper. Since the master is easy to make, stencil printing is utilized in a wide range of fields. As stencil printing inks, have commonly been used water-in-oil (W/O) emulsion inks which contain pigments as colorants in the oil phase thereof, as disclosed in Japanese Patent Laid-open (Kokai) Nos. 255967/86, 14284/89, 132777/92 and 117565/93.

Once this type of W/O emulsion ink is printed on an article such as printing paper to be printed the oil phase, which is the outer phase of emulsion first, permeates the printed article, and then the water phase, which is the inner phase of emulsion, permeates the printed article and/or evaporates therefrom. Since conventional W/O emulsion inks contain pigments in the oil phase, they are low in permeation speed. In addition, permeation of pigments contained in the oil phase occurs concurrently with the permeation of the oil phase, and as a result, inks often have a problem on seep through because pigments deeply permeate into the printed article. Similarly, this phenomenon of permeation occurs on a surface of paper, causing inks to spread on the surface of the paper and blurring the printing.

In order to overcome such disadvantages as mentioned above, it has been suggested that water-insoluble colorants are dispersed in the water phase, as disclosed in Japanese Patent Laid-open (Kokai) Nos. 188598/95, 34944/96 and 218025/96. Such emulsion inks are superior in that they are high in printing density and low in ink spreading and seep through. Preparation process of emulsion inks disclosed in prior art is a process in which a water phase is previously obtained by mixing colorants with the other water phase components and then the water phase is added to the oil phase to emulsify the mixture. However, such a preparation process requires changes of blending ratio and the like at the preparation stage of the water phase if properties of colorants are changed, and thus is low in production efficiency particularly in an industrial scale. Production efficiency is further lowered when an ink of a mixed color containing two or more kinds of water-insoluble colorants is prepared.

On the other hand, conventional inks of mixed color, which contain two or more kinds of water-insoluble colorants in the oil phase thereof, often have a problem on aggregation of colorants in the oil phase that is a continuous phase, and thus often show a color greatly different from a desired one.

It is an object of the present invention to overcome the above problems of prior art and to provide a preparation process of stencil printing emulsion inks, which can readily produce a water-in-oil (W/O) emulsion ink containing a water-insoluble colorant in the water phase thereof, and which can be adapted to preparation of various kinds of inks of mixed colors.

According to the present invention, the above object is attained by a process for preparing a water-in-oil (W/O) emulsion ink for stencil printing, having an oil phase and a water phase, said water phase containing a water-insoluble colorant, which comprises the steps of preparing an aqueous dispersion of said water-insoluble colorant separately from water or an aqueous solution of the remaining water phase components, and adding said aqueous dispersion and water or said aqueous solution separately to said oil phase for emulsification.

In the present invention, an aqueous dispersion of a water-insoluble colorant is previously prepared separately from water or an aqueous solution of the remaining components of the water phase, and then is added directly to the oil phase. Thus, even if properties of the colorant are changed an emulsion ink can be produced with a uniform quality, particularly a uniform viscosity by varying addition amount of water or the aqueous solution that contains the remaining components of the water phase. The present preparation process is useful particularly in an industrial scale.

Preparation process for conventional emulsion inks which contain water-insoluble colorants in the oil phase require different oil phases for different colors of inks. This is because properties and blending ratios of the oil phase vary depending upon kinds of water-insoluble colorants contained in the oil phase. According to the present invention, a common oil phase can be used regardless of kinds of water-insoluble colorants since no colorant is contained in the oil phase. According to the present invention, if several aqueous dispersions of colorants of different colors are previously prepared, inks of different colors can readily be prepared by adding to the oil phase at lease one selected from the above dispersions in accordance with a desired color. The final properties such as viscosity of the ink can readily be adjusted by addition of water or an aqueous solution of the other water phase components. In other words, all the present steps other than the step of preparing aqueous dispersions of colorants can be common regardless of kinds of colorants, and thus the present invention is suitable for manufacture of various kinds of inks.

In the present invention, aqueous dispersions of colorants may be added to the oil phase before or after water or an aqueous solution of the other water phase components is added to the oil phase. Alternatively, aqueous dispersions of colorants may be added to the oil phase at the same time when water or an aqueous solution of the other water phase components is added to the oil phase. However, it is advantageous to add the aqueous dispersions to the oil phase before water or an aqueous solution of the other water phase components is added to the oil phase, because washing of piping or the like is performed by water or the aqueous solution.

In the present invention, the aqueous dispersion of colorant may contain one kind of water-insoluble colorant, or may contain two or more kinds of water-insoluble colorants. In other words, the present invention can be readily adapted to preparation of an ink containing two or more kinds of water-insoluble colorants in the water phase, particularly an ink of a mixed color. When an ink containing two or more kinds of water-insoluble colorants is prepared, a previously-prepared aqueous dispersion containing two or more kinds of water-insoluble colorants may be added to the oil phase separately from water or an aqueous solution of the other water phase components, or a plurality of previously-prepared aqueous dispersions each of which contains one kind of colorant may be added directly to the oil phase separately from water or an aqueous solution of the other water phase components.

The present preparation process can be practiced by an apparatus for preparing a water-in-oil (W/O) emulsion ink for stencil printing, said emulsion ink having an oil phase and a water phase and containing a water-insoluble colorant in said water phase, which comprises an emulsifier in which a water phase is emulsified in an oil phase, an oil phase supplying means, coupled to said emulsifier, for supplying said oil phase to said emulsifier, a colorant supplying means, coupled to said emulsifier, for supplying an aqueous dispersion of a water-insoluble colorant to said emulsifier, and a water phase supplying means, coupled to said emulsifier independently from said colorant supplying means, for supplying water or water phase components other than said colorant to said emulsifying means. The colorant supplying means may comprise a plurality of dispersers in which a colorant is dispersed in water. These dispersers may be connected to said emulsifier independently from each other.

According to another aspect of the present invention, a process for preparing an emulsion ink for stencil printing, having an oil phase and a water phase, said water phase containing two or more kinds of water-insoluble colorants, which comprises preparing a plurality of aqueous dispersions each of which contains a different kind of water-insoluble colorant, mixing all the aqueous dispersions and the other water phase components together to obtain a water phase, and then adding said water phase to said oil phase for emulsification. Since each of the water-insoluble colorants is previously made into an aqueous dispersion separately from each other, this process is also efficient in production of inks containing two or more kinds of water-insoluble colorants such as inks of mixed color, particularly in an industrial scale.

This preparation process can be practiced by an apparatus for preparing a water-in-oil (W/O) emulsion ink for stencil printing, said emulsion ink having an oil phase and a water phase and containing a water-insoluble colorant in said water phase, which comprises an emulsifier in which a water phase is emulsified in an oil phase, an oil phase supplying means, coupled to said emulsifier, for supplying said oil phase to said emulsifier, and a water phase supplying means, coupled to said emulsifier, for supplying said water phase to said emulsifier, said water phase supplying means comprising a plurality of dispersers in which colorants are dispersed in water and means coupled to said dispersers and said emulsifier for mixing the dispersions of colorants resulting from said dispersers together with water or the remaining water phase components and supplying the resultant mixture to said emulsifier.

In the present invention, water-in-oil (W/O) emulsion inks can readily be made, for examples by gradually adding 90 to 30% by weight of a water phase to 10 to 70% by weight of an oil phase to emulsify the mixture.

In the present invention, the water phase comprises water, a water-insoluble colorant, and various additives. According to the present invention, the water-insoluble colorant is previously made into an aqueous dispersion, and water or an aqueous solution of various additives is prepared separately from the aqueous dispersion of colorant, before added to the oil phase.

As a water-insoluble colorant, may be used known pigments, dispersed dyes and the like of various colors. Examples of the water-insoluble colorant are carbon blacks such as furnace carbon black, lampblack, acetylene black and channel black; inorganic pigments including oxides, sulfides and the like such as of cobalt, iron, chromium, copper, zinc, lead, titanium, vanadium, manganese and nickel; organic pigments such as azo-based, phthalocyanine-based, dye-based, condensed ring-based, nitro-based, nitroso-based, alkali blue-based and aniline black-based pigments; and dispersed dyes such as azo-based anthraquinone-based, azomethine-based and nitro-based ones.

The aqueous dispersion of water-insoluble colorants preferably comprises a dispersant in order to improve wetting, dispersibility and the like of water-insoluble colorants in water. Examples of the dispersant are anionic surfactants, cationic surfactants, amphoteric surfactants, nonionic surfactants, polymeric, silicone-containing or fluorochemical surfactants, or such tertiary amine compounds as disclosed in Japanese Patent Laid-open (Kokai) No. 34944/96 corresponding to U.S. Pat. No. 5,609,670, or such acid anhydride containing water-soluble polymers as disclosed in Japanese Patent Application No. 177518/96 corresponding to U.S. patent application Ser. No. 08/874,633 filed Jun. 13, 1997.

Among these dispersants, tertiary amine compounds and acid anhydride containing water-soluble polymers are particularly preferred. By employing these compounds as dispersants, the water-insoluble colorant can finely and stably be dispersed in water, highly-improved images or colors can be provided by virtue of the fine dispersion of the water-insoluble colorant, and a W/O emulsion ink excellent in emulsion stability can be obtained. When ordinary dispersants which are polymer compounds containing in molecule such functional groups as carboxyl or sulfonic acid groups that adsorb the surface of pigments, are used, the emulsion sometimes tends to be destructed. This is because such polymer compounds would also adsorb the interface between the oil phase and the water phase to deteriorate stability of the emulsion.

The tertiary amine compound includes polymer compounds such as polyvinyl pyrrolidone, polyethyleneimine, alkylolamine salts, and poly-N-acryloylpyrrolidine. The acid anhydride containing water-soluble polymer includes, for example, acid anhydride containing olefin copolymers, acid anhydride containing vinyl copolymers, and salts and esters thereof. The acid anhydride containing olefin copolymers include copolymers of olefins such as ethylene and isobutylene with ethylenically unsaturated monomers containing acid anhydrides such as maleic anhydride. The acid anhydride containing vinyl copolymers include copolymers of aromatic vinyl monomers, vinyl ester monomers or vinyl ether monomers with ethylenically unsaturated monomers containing acid anhydrides such as maleic anhydride. As aromatic vinyl monomers, mention may be made of styrene, α-methylstyrene, p-methylstyrene, vinyltoluene, p-butylstyrene, vinylnaphthalene, vinylanthracene, p-arylsulfoxyaminostyrene and p-styrenesulfonic acid and the like. As vinyl ester monomers, mention may be made of vinyl acetate, acrylic acid, acrylic acid ester, methacrylic acid ester and the like. As vinyl ether monomers, mention may be made of methylvinylether and the like. Among them, preferred acid anhydride containing water-soluble polymers are isobutylene-maleic anhydride copolymers, and styrene-maleic anhydride copolymers.

Addition amount of the tertiary amine compound and the acid anhydride containing water-soluble polymer is not specifically limited. Since these components are usually polymers, the more the addition amount is, the greater the thickening effect is. Since dispersants, in such case, only have to be added in a minimum amount to finely and stably disperse the water-insoluble colorant in water, it is preferred that the addition amount is appropriately determined depending upon kinds of dispersants.

In the present invention, the water phase may further comprise an oil-in-water (O/W) emulsion of resin and/or a water soluble resin as additives. By adding these components to the water phase, fixation of the water-insoluble colorant to articles to be printed such as paper can be improved. These additives may be contained in the aqueous dispersion of water-insoluble colorants.

Examples of the O/W emulsion of resin include emulsions of resins such as polyvinyl acetate, copolymers of ethylene and vinyl acetate, copolymers of vinyl acetate and acrylic acid esters, polymethacrylic acid esters, polystyrene, copolymers of styrene and acrylic acid esters, styrene-butadiene copolymers, copolymers of vinylidene chloride and acrylic acid esters, polyvinyl chloride, copolymers of vinyl chloride and vinyl acetate, and polyurethane.

Examples of the water soluble resin include polyvinyl alcohol, methyl cellulose, carboxymethyl cellulose, hydroxyethyl cellulose, polyvinyl pyrrolidone, copolymers of polyethylene and polyvinyl alcohol, polyethylene oxide, polyvinyl ether, polyacrylamide, gum arabic, starch, and water-soluble polyurethane.

Addition amount of the O/W emulsion of resin and/or the water-soluble resin is preferably 20% by weight or less, more preferably 10% by weight or less as solid content based on the total weight of the ink. If it exceeds 20% by weight, inks form a film on perforations of a stencil sheet and become difficult to pass the perforations when inks are left on the stencil sheet for a long time.

As required, the water phase may further contain other water soluble additives such as wetting agents, electrolytes, antifungal agents, antioxidants, water evaporation inhibiting agents and the like. These additives may be contained in the aqueous dispersion of water-insoluble colorants.

In the present invention, the oil phase basically comprises a non-volatile solvent, a volatile solvent, an emulsifying agent and the like.

As the non-volatile solvent, can be used mineral oils such as motor oils, spindle oils, machine oils and liquid paraffin, and vegetable oils such as olive oil, castor oil and salad oils. As the volatile solvent, can be used known solvents of the types of mineral oils and vegetable oils.

The emulsifying agent is used to form the W/O emulsion, and is preferably a nonionic surfactant. As such a nonionic surfactant, mention may be made of sorbitan fatty acid esters such as sorbitan monolaurate, sorbitan monopalmitate, sorbitan monooleate, sorbitan sesquioleate and sorbitan monoisostearate; (poly)glycerol fatty acid esters such as glyceryl monostearate, decaglyceryl decaoleate and hexaglyceryl pentaoleate, and ethylene oxide adducts thereof; propyleneglycol fatty acid esters; (poly)ethylene glycol fatty acid esters; and ethylene oxide adducts of fatty acids, alkylethers, alkylphenols and (hardened) castor oils. It is desired that the emulsifying agent is properly selected so that the W/O emulsion of ink is not destroyed by surfactants that may be contained to disperse water-soluble colorants or to form O/W emulsions of resin in the water phase of the present ink.

The oil phase may further comprise a resinous component so as to provide an ink with a viscosity suitable for stencil printing. Examples of the resinous component are alkyd resins, phenolic resins, maleic resins, petroleum resins and the like. dr Hereinafter, the present invention will be explained in more detail with reference to presently preferred embodiments shown in the accompanying drawings in which, FIG. 1 is a flow diagram which shows an embodiment of the present preparation apparatus, and FIG. 2 is a flow diagram which shows an embodiment of the present apparatus for preparing a water-in-oil (W/O) ink which contains two or more kinds of colorants in the water phase thereof.

Figure 2:
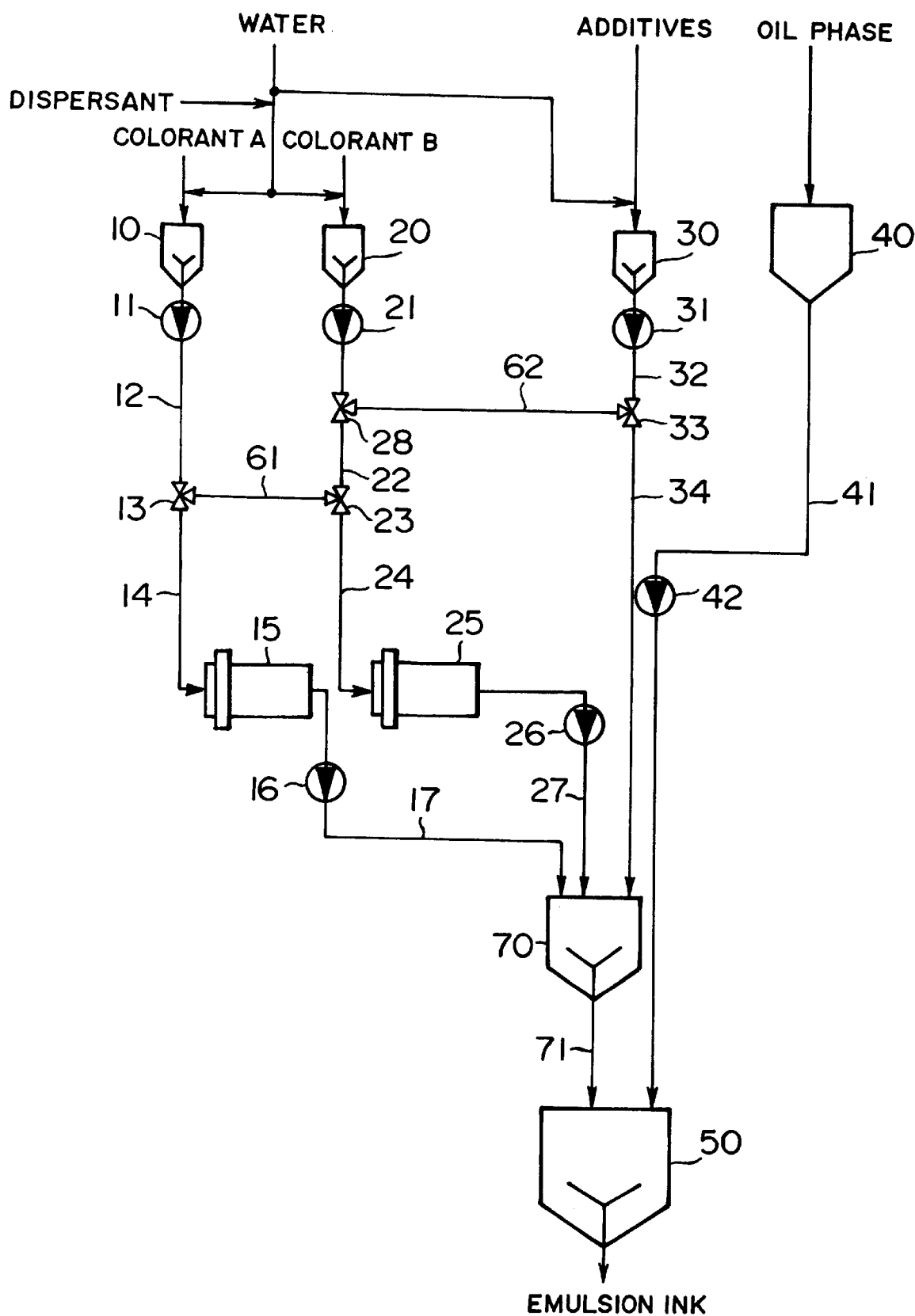

FIG. 1 is a flow diagram of an apparatus suitable for practicing the present preparation process. In FIG. 1, the reference numerals 10 and 20 denote stirred tanks for mixing a water-insoluble colorant with water and a dispersant. The reference numeral 30 denotes a stirred tank for preparing an aqueous solution containing the other water phase components than the water-insoluble colorant. The reference numeral 40 denotes a storage tank for the oil phase that has previously been prepared. The reference numeral 50 denotes an emulsifier in which the water phase is mixed with the oil phase for emulsification. The tank 40 is connected to the emulsifier 50 via a conduit 41 equipped with a pump 42, and thus constitutes an oil phase supplying means that supplies the oil phase to the emulsifier 50.

The stirred tank 10 is connected to a bead mill 15 via conduits 12 and 14, and a mixture contained in the stirred tank 10 is introduced into the bead mill 15 by a pump 11 installed on the conduit 12. In the bead mill 15, an aqueous dispersion of colorant A is prepared. Similarly, the stirred tank 20 is connected to a bead mill 25 via conduits 22 and 24, and a mixture contained in the stirred tank 20 is introduced into the bead mill 25 by a pump 21 installed on the conduit 22. In the bead mill 25, an aqueous dispersion of colorant B is prepared.

The bead mills 15 and 25 are respectively connected to the emulsifier 50 via conduits 17 and 27 which are respectively equipped with pumps 16 and 26. Thus, they constitute a colorant supplying means for supplying aqueous dispersions of colorants A and B to the emulsifier 50.

The stirred tank 30 is connected to the emulsifier 50 via a conduit 34 and a conduit 32 which is equipped with a pump 31, and thus constitutes a means which is independent from the colorant supplying means and functions to supply water or an aqueous solution of water phase components other than colorants to the emulsifier 50.

When an ink containing one kind of colorant is produced, either bead mill 15 or 25 is connected to the emulsifier 50 to supply an aqueous dispersion of colorant. When an ink containing two kinds of colorants is produced, both bead mills 15 and 25 are connected to the emulsifier 50 to supply aqueous dispersions of colorants. Thus, inks can be produced using the same oil phase regardless of kinds of colorants. Emulsion properties such as viscosity, which would vary depending upon kinds of colorants, can be controlled by varying an amount of the water phase components supplied from the tank 30 so that the viscosity of the resultant ink is kept constant.

In the apparatus of FIG. 1, the conduits 12 and 22 have a bypass conduit 61. The conduits 12, 14 and 61 are connected together by a three-way valve 13. The conduits 22, 24 and 61 are connected together by a three-way valve 23. Thus, by operating the three-way valve 13, a mixture of the stirred tank 10 can be introduced into the bead mill 25 by way of the conduits 12, 61, and 24. Similarly, by operating the three-way valve 23, a mixture of the stirred tank 20 can be introduced into the bead mill 15 by way of the conduits 22, 61 and 14. Thus, when an ink containing two kinds of colorants is produced, the bead mill 15 may be supplied with not only the colorant A but also the colorant B via the bypass conduit 61. In this case, two kinds of colorants are mixed together in a single ball mill 15, and an aqueous dispersion containing two kinds of colorants is added to the emulsifier 50.

The apparatus of FIG. 1 is further equipped with a bypass conduit 62 between the conduits 32 and 22. The conduits 32 and 22 are connected to the bypass conduit 62 by three-way valves 33 and 28, respectively. Thus, when water or a water phase component without colorants flows from the conduit 32 into the conduit 22 via the bypass conduit 62, the bead mills 15 and 25 and accessories thereof are washed.

FIG. 2 shows an apparatus having the same structure as in FIG. 1 except that a stirred tank 70 is further provided, in which aqueous dispersions of colorants obtained in bead mills 15 and 25 are mixed under stirring with water or an aqueous solution supplied from the stirred tank 30, and which is connected to the emulsifier 50 via a conduit 71 to supply the water phase to the emulsifier 50. The apparatus of FIG. 2 is a novel and useful structure for preparing inks of mixed color, which contain two different kinds of colorants, particularly those of different colors. When an ink of a mixed color is prepared, color of the ink often varies depending upon slight variation of blending proportion of colorants. According to the apparatus of FIG. 2, blending proportion of colorants can be accurately adjusted since colorants are made into aqueous dispersions separately from each other and then mixed together in the form of dispersions. Thus, the apparatus of FIG. 2 can stably produce inks of a predetermined color.

In FIGS. 1 and 2, embodiments are shown, in which two kinds of colorants are used. However, it is apparent that the present invention can be readily adapted to the case where three or more kinds of colorants are used, just by increasing the number of stirred tanks 10 and 20 or bead mills 15 and 25. Also, it is apparent that the bead mill 15 or 25 used as a disperser in FIGS. 1 and 2 may be replaced with a ball mill or other types of disperses.

EXAMPLES

Hereinafter, working examples of preparation of inks by use of the apparatuses of FIGS. 1 and 2 will be described. In the following examples, the term "part(s)" means "part(s) by weight" unless otherwise indicated.

EXAMPLE 1

An emulsion ink was prepared using the apparatus of FIG. 1 in accordance with the formulation shown in Table 1. First, an oil phase was prepared by mixing alkyd resin, #40 motor oil, No. 5 solvent and sorbitan monooleate, and was introduced from the storage tank 40 into a batch-processing emulsifier 50.

On the other hand, furnace carbon black as a water-insoluble colorant was mixed with an aqueous solution of polyvinyl pyrrolidone in the stirred tank 10, and then was dispersed in the bead mill 15 to obtain an aqueous dispersion of colorant. In the stirred tank 30, an aqueous solution of ethylene glycol was prepared.

Then, a stencil printing emulsion ink was obtained by adding the aqueous dispersion of colorant from the bead mill 15 to the emulsifier 50 so that the dispersion was emulsified in the oil phase, and then adding the aqueous solution of ethylene glycol from the stirred tank 30 to the emulsifier 50 so that the solution was emulsified in the oil phase. The resultant emulsion ink had the same viscosity as in Comparative Example 1.

EXAMPLE 2

A stencil printing emulsion ink was obtained in the same manner as in Example 1, except that the aqueous solution of ethylene glycol was added to the emulsifier 50 before the aqueous dispersion of colorant was added to the emulsifier 50. The resultant emulsion ink had the same viscosity as in Example 1 and Comparative Example 1.

EXAMPLE 3

An emulsion ink was prepared using the apparatus of FIG. 1 in accordance with the formulation shown in Table 1. First, an oil phase was prepared by mixing alkyd resin, #40 motor oils No. 5 solvent and sorbitan monooleate, and was introduced from the storage tank 40 into a batch-processing emulsifier 50.

On the other hand, phthalocyanine blue as a water-insoluble colorant was mixed with an aqueous solution of polyvinyl pyrrolidone in the stirred tank 10, and Pigment Yellow as a water-insoluble colorant was mixed with an aqueous solution of polyvinyl pyrrolidone in the stirred tank 20. The two kinds of colorants were both introduced into the bead mill 15 for mixed dispersion by connecting the stirred tank 10 to the bead mill 15 and connecting the stirred tank 20 to the bead mill 15 via the bypass conduit 61. In the stirred tank 30, an aqueous solution of ethylene glycol was prepared.

Then, a stencil printing emulsion ink was obtained by adding the aqueous dispersion of mixed colorants from the bead mill 15 to the emulsifier 50 so that the dispersion was emulsified in the oil phase, and then adding the aqueous solution of ethylene glycol from the stirred tank 30 to the emulsifier 50 so that the solution was emulsified in the oil phase. The resultant emulsion ink was not inferior in coloring, but provided stencil prints with sharp images.

EXAMPLE 4

A stencil printing emulsion ink was obtained in the same manner as in Example 3, except that separate aqueous dispersions of colorants were obtained by connecting the stirred tank 10 to the bead mill 15 and connecting the stirred tank 20 to the bead mill 25, and then the aqueous dispersion of phthalocyanine blue was added from the bead mill 15 to the emulsifier 50, followed by addition of the aqueous dispersion of Pigment Yellow from the bead mill 25 to the emulsifier 50 and a subsequent addition of the aqueous solution of ethylene glycol from the stirred tank 30 to the emulsifier 50. The resultant emulsion ink had the same viscosity as in Example 3, and provided stencil prints with printed images of quality comparable to Example 3.

EXAMPLE 5

An emulsion ink was prepared using the apparatus of FIG. 2 in accordance with the formulation shown in Table 1. First, an oil phase was prepared by mixing alkyd resin, #40 motor oil, No. 5 solvent and sorbitan monooleate, and was introduced from the storage tank 40 into a batch-processing emulsifier 50. In the stirred tank 30, an aqueous solution of ethylene glycol was prepared.

On the other hand, phthalocyanine blue as a water-insoluble colorant was mixed with an aqueous solution of polyvinyl pyrrolidone in the stirred tank 10 and Pigment Yellow as a water-insoluble colorant was mixed with an aqueous solution of polyvinyl pyrrolidone in the stirred tank 20. Separate aqueous dispersions of colorants were obtained by connecting the stirred tank 10 to the bead mill 15 and connecting the stirred tank 20 to the bead mill 25. Then, a water phase was prepared in the stirred tank 70 by introducing the aqueous dispersion of phthalocyanine blue from the bead mill 15 to the stirred tank 70, introducing the aqueous dispersion of Pigment Yellow from the bead mill 25 to the stirred tank 70, and further introducing an aqueous solution of ethylene glycol from the stirred tank 30 to the stirred tank 70, so that they were mixed together in the stirred tank 70.

Then, a stencil printing emulsion ink was obtained by adding the water phase from the stirred tank 70 to the emulsifier 50 so that the water phase was emulsified in the oil phase. The resultant emulsion ink had the same viscosity as in Example 3, and provided stencil prints with printed image of quality comparable to Example 3.

COMPARATIVE EXAMPLE 1

An emulsion ink was prepared using the apparatus of FIG. 2 in accordance with the formulation shown in Table 1. First an oil phase was prepared by mixing alkyd resin, #40 motor oil, No. 5 solvent and sorbitan monooleate, and was introduced from the storage tank 40 into a batch-processing emulsifier 50. In the stirred tank 30, an aqueous solution of ethylene glycol was prepared.

On the other hand, furnace carbon black as a water-insoluble colorant was mixed with an aqueous solution of polyvinyl pyrrolidone in the stirred tank 10. An aqueous dispersion of colorant was obtained by connecting the stirred tank 10 to the bead mill 15. Then, a water phase was prepared in the stirred tank 70 by introducing the aqueous dispersion of colorant from the bead mill 15 to the stirred tank 70 and introducing the aqueous solution of ethylene glycol from the stirred tank 30 to the stirred tank 70.

Then, a stencil printing emulsion ink was obtained by adding the water phase from the stirred tank 70 to the emulsifier 50 so that the water phase was emulsified in the oil phase.

TABLE 1

Formulations of W/O emulsion inks (parts by weight)

| Number of Examples | Examples 1 & 2, & Comparative Example 1 | Examples 3, 4 & 5 |
|---|---|---|
| Oil phase: | | |
| Alkyd resin: | 13.0 | 13.0 |
| #40 Motor oil: | 10.0 | 10.0 |
| No. 5 Solvent (manufactured by Nippon Oil Co. Ltd.): | 4.0 | 4.0 |
| Sorbitan monooleate: | 3.0 | 3.0 |
| Aqueous dispersions of water-insoluble colorants: | | |
| Furnace carbon black | 5.0 | — |
| Phthalocyanine blue | — | 2.5 |
| Pigment Yellow | — | 2.5 |
| Dispersant (polyvinyl pyrrolidone) | 1.0 | 1.0 |
| Water (ion-exchanged water) | 25.0 | 25.0 |
| Other water phase components: | | |
| Ethylene glycol | 5.0 | 5.0 |
| Water (ion-exchanged water) | 34.0 | 34.0 |
| TOTAL | 100.0 | 100.0 |

According to the present invention, water-in-oil emulsion inks containing water-insoluble colorants in the water phase thereof can be prepared without excess equipment, and various kinds of inks can readily be produced.

We claim:

1. A process for preparing a water-in-oil (W/O) emulsion ink for stencil printing, having an oil phase and a water phase, said water phase containing a water-insoluble colorant, which comprises the steps of preparing an aqueous dispersion of said water-insoluble colorant separately from water or an aqueous solution of the remaining water phase components, and adding said aqueous dispersion and water or said aqueous solution separately to said oil phase for emulsification.

2. A process for preparing a stencil printing emulsion ink according to claim 1, in which said aqueous dispersion comprises one kind of water-insoluble colorant.

3. A process for preparing a stencil printing emulsion ink according to claim 1, in which said aqueous dispersion comprises two or more kinds of water-insoluble colorants.

4. A process for preparing a stencil printing emulsion ink according to claim 1, in which said aqueous dispersion comprises a single dispersion which contains two or more kinds of water-insoluble colorants.

5. A process for preparing a stencil printing emulsion ink according to claim 1, in which said aqueous dispersion comprises two or more separate dispersions each of which contains a different kind of water-insoluble colorant and is added to the oil phase separately from each other.

6. A process for preparing an emulsion ink for stencil printing, having an oil phase and a water phase, said water phase containing two or more kinds of water-insoluble colorants, which comprises preparing a plurality of aqueous dispersions each of which contains a different kind of water-insoluble colorant, mixing all the aqueous dispersions and the other water phase components together to obtain a water phase, and then adding said water phase to said oil phase for emulsification.

7. A process for preparing a stencil printing emulsion ink according to any one of claims 1–6, in which said water-insoluble colorants are dispersed in said aqueous dispersions by addition of a dispersant.

8. An apparatus for preparing a water-in-oil (W/O) emulsion ink for stencil printing, said emulsion ink having an oil phase and a water phase and containing a water-insoluble colorant in said water phase, which comprises an emulsifier in which a water phase is emulsified in an oil phase, an oil phase supplying means, coupled to said emulsifier, for supplying said oil phase to said emulsifier, a colorant supplying means, coupled to said emulsifier, for supplying an aqueous dispersion of a water-insoluble colorant to said emulsifier, and a water phase supplying means, coupled to said emulsifier independently from said colorant supplying means, for supplying water or water phase components other than said colorant to said emulsifying means.

9. An apparatus according to claim 1, in which said colorant supplying means comprises a plurality of dispersers in which colorant is dispersed in water and which connect said emulsifier independently from each other.

10. An apparatus for preparing a water-in-oil (W/O) emulsion ink for stencil printing, said emulsion ink having an oil phase and a water phase and containing a water-insoluble colorant in said water phase, which comprises an emulsifier in which a water phase is emulsified in an oil phase, an oil phase supplying means, coupled to said emulsifier, for supplying said oil phase to said emulsifier, and a water phase supplying means, coupled to said emulsifier, for supplying said water phase to said emulsifier, said water phase supplying means comprising a plurality of dispersers in which colorants are dispersed in water and means coupled to said dispersers and said emulsifier for mixing the dispersions of colorants resulting from said dispersers together with water or the remaining water phase components and supplying the resultant mixture to said emulsifier.

* * * * *